United States Patent Office 3,549,596
Patented Dec. 22, 1970

---

3,549,596
SEGMENTED ELASTOMERS FROM ISOMERIC MIXTURES OF 1,3-DIAMINOCYCLOHEXANE AND STERICALLY HINDERED TERTIARY DIISOCYANATES
Carl Kenneth McMillin and Wilford John Teerlink, Waynesboro, Va., assignors to E. I. du Pont de Nemours and Company, Wilmington, Del., a corporation of Delaware
No Drawing. Continuation-in-part of application Ser. No. 467,092, June 25, 1965. This application June 23, 1966, Ser. No. 559,728
The portion of the term of the patent subsequent to Apr. 21, 1987, has been disclaimed
Int. Cl. C08g 22/04, 22/18
U.S. Cl. 260—75      14 Claims

ABSTRACT OF THE DISCLOSURE

Segmented elastomers derived from hydroxyl-terminated or amine-terminated amorphous polymers, certain sterically hindered tertiary diisocyanates, and certain isomeric mixtures of 1,3-diaminocyclohexane, exhibit good solubility in commercial solvents and may be spun to elastomeric fibers having high whiteness-retention and elastic power.

RELATED APPLICATIONS

This application is a continuation-in-part of co-pending application Ser. No. 467,092, filed June 25, 1965, abandoned May 14, 1968.

SPECIFICATION

This invention relates to segmented polymers and to elastic filaments formed thereof. These segmented polymers are conveniently prepared from hindered tertiary diisocyanates and 1,3-diaminocyclohexane.

Elastic, segmented polymers prepared from polymeric glycols, aromatic diisocyanates, and various chain-extenders are well known for the formation of spandex fibers having good fiber properties, such as high elastic modulus (elastic "power"). Because of the aromatic diisocyanates conventionally used, the products have a tendency to yellow on exposure to light, acid fumes, and chlorine. Spandex fibers from aliphatic diisocyanates are known to be resistant to such yellowing, but unfortunately they have inferior elastic power as compared to the spandex fibers derived from aromatic diisocyanates. Heretofore, efforts have not been fully successful in obtaining in a single elastic polymer the highly desirable combination of both resistance to discoloration and suitable elastic power.

This invention provides segmented polymers which, in the form of elastic filaments, have a unique combination of high whiteness-retention and high elastic power. These segmented polymers exhibit outstandingly good solubility in commercial solvents, thereby permitting the preparation of solutions of high concentration for the spinning of spandex filaments.

As is well recognized in the textile industry, the term "spandex" is applied to elastic fibers in which at least 85% by weight of the fiber-forming polymeric material is a long-chain segmented polyurethane. More specifically, the polymer molecules of the segmented polyurethane may, according to the classic definition, be considered as consisting essentially of 50 to 95% by weight of recurring amorphous or so-called "soft" segments and 5 to 50% by weight of recurring so-called "hard" segments, urethane linkages serving to join the segments together in the polymer molecules. The amorphous segments are each defined as the residue remaining after removal of the terminal functional groups from an amorphous polymer having a melting point below 60° C. and a molecular weight above 600. The hard segments comprise the remainder of the polymer molecules lying between the urethane linkages and contain at least one repeating unit of a nitrogen-containing polymer which in its fiber-forming molecular weight range has a melting point above about 200° C. In a preferred embodiment of the present invention, an improved form of segmented polyurethane, according to this definition, is provided in that the hard segments in the segmented polyurethane molecules have the formula:

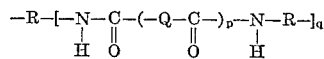

wherein

Q is a radical obtained by the removal of one hydrogen atom from each of two functional groups of a polyfunctional compound, Q and p being so selected that at least 90 mol percent of the radicals within the brackets have the formula

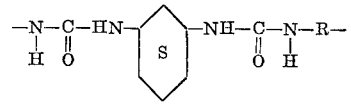

R is an organic radical containing more than one carbon atom and free from substituents reactive with isocyanate, at least 55 mol percent of the R radicals having the formula

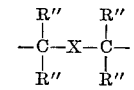

wherein

R″ is a lower alkyl radical selected from the class consisting of methyl, ethyl, and n-propyl,
X is a radical selected from the class consisting of (a) p-phenylene, (b) p-xylene, (c) 1,4-cyclohexylene, (d) 4,4′-biphenylene, (e) 1,4-naphthylene, (f) 1,5-naphthylene, (g) 2,6-naphthylene, (h)

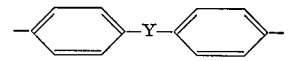

wherein —Y— is selected from the class consisting of —CH$_2$—, —CH$_2$CH$_2$—, —O—,

—S—, —CO—, and —SO$_2$—, (i) radicals as defined in (b), (d), (e), (f), (g), and (h) hydrogenated in the ring, and (j) radicals as defined in (a), (b), (c), (d), (e), (f), (g), (h), and (i) having substituted on the ring at least one substituent of the class consisting of methyl, methoxy, and ethyl;

q is a small positive integer, i.e. from 1 to about 8; and
p is an integer selected from the class consisting of zero and 1.

The segmented polymers of the invention may be more generally described as consisting essentially of recurring units of the formula:

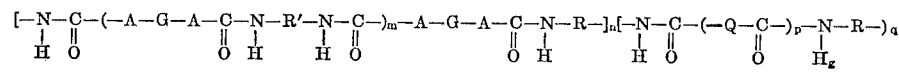

wherein

G is a long chain polymeric radical free from substituents reactive with isocyanate and having a molecular weight of a least 600;

A is selected from the class consisting of O and NH;

R' is an organic radical containing more than one carbon atom and free from substituents reactive with isocyanate;

M is an integer selected from the class consisting of zero and small positive integers, i.e. from 1 to about 8;

N is a small positive integer, i.e. from 1 to about 8; and

Q, R, $p$, and $q$ are as above defined.

The hard segments, having a formula as described above, are connected through linkages of the formula

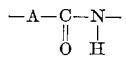

to the soft segments which comprise the radicals—G— plus any intermediate radicals. Where A is oxygen, fibers of the polymer can be appropriately referred to as spandex fibers. However, the invention also contemplates urea polymers and fibers thereof, i.e. where A in the formula is NH.

Preferably, at least 80 mol percent of the R radicals have terminal carbon atoms which are attached to the adjacent nitrogen atoms of the molecular chain of the recurring unit and which form no part of an aromatic ring. The presence of aromatic rings immediately adjacent these nitrogen atoms would substantially increase the susceptibility of the polymer, thus fibers and films thereof, to yellowing upon exposure to light, acid fumes, and chlorine such that the full advantages of this invention would not be realized. For this reason such aromatic radicals are to be either avoided completely or used in minor proportions. It will be understood that radicals containing aromatic rings but terminating in carbon atoms which form no part of the aromatic ring may be used.

The segmented polymers of this invention are conveniently prepared by reacting together a lowmelting polyfunctional polymer, an organic polyisocyanate, and a polyfunctional active-hydrogen compound which serves as a chain-extending agent. Preferably each of these components is difunctional so that the polymer is substantially linear. However, the use of certain trifunctional and tetrafunctional components to gain some degree of cross-linking is also within the scope of the invention as will be apparent from the disclosure hereinafter.

As may be seen from the formula presented hereinabove, the segmented polymers consist of alternating first and second segments. The first segment contains the residue G which remains after removal of terminal hydroxyl or amine groups from a hydroxy-terminated or amine-terminated polymer melting below 60° C. and having a molecular weight above 600. The second segment comprises at least one repeating unit of a polyurea having a melting point above about 200° C. in its fiber-forming molecular-weight range (i.e. above 10,000). As further explained hereinafter, the segmented polymers are obtained according to conventional polymerization techniques by first reacting a difunctional polymer having a molecular weight between 600 and about 5,000 and a molar excess of a polyisocyanate component. There is thus formed an isocyanate-terminated polymer, which is thereafter chain-extended by reaction with a compound containing more than one active hydrogen atom. The polyisocynate component includes, at least in part, one or more of certain hindered tertiary compounds and the chain-extender is, at least in part, 1,3-diaminocyclohexane.

In the preparation of the segmented polymers, the difunctional polymer is preferably a polymeric gylcol HO—G—OH having a molecular weight of at least 600. These polymeric glycols include the hydroxy-terminated polyethers, polyesters, copolyether-esters, polyacetals, polysiloxanes, and N-alkylated polyurethanes, all of which are well known in the art. Mixtures of these polymeric glycols may be used. From a standpoint of commercial availability, the preferred polymeric glycols for this invention are the polyether glycols, polyester glycols, and mixtures thereof.

The main group of suitable polyethers is the polyalkylene ethers, such as polyethylene glycol, polypropylene ether glycol, polytetramethylene ether glycol, polyhexamethylene ether glycol, etc. Mixtures of monomeric compounds may be used to prepare copolyethers. Some of the alkylene radicals in the polyether may be replaced by arylene or divalent cycloaliphatic radicals. The preferred polyether glycol is polytetramethylene ether glycol.

The polyester glycols may be prepared by reacting dibasic acids, esters, or acid halides with a molar excess of monomeric glycol, as is well known in the art. Suitable glycols are the polymethylene glycols, such as ethylene, trimethylene, pentamethylene, hexamethylene, decamethylene glycols; substituted polymethylene glycols, such as propylene glycol and 2-ethyl-2-methylpropane diol; and cyclic glycols, such as cyclohexanediol. These glycols may be reacted with the proper molar ratio of aliphatic, cycloaliphatic, or aromatic acids or their ester-forming derivatives to produce low-molecular-weight polymers. Suitable acids for preparing polyesters and/or copolyesters include carbonic, adipic, sebacic, terephthalic, and hexahydroterephthalic acids. Mixtures of glycols and/or mixtures of acids or acid derivatives to form copolyesters may also be employed. The alkyl- and halogen-substituted derivatives of these acids may also be used. An ether-containing glycol such as triethylene glycol, may be used to produce polyetherester glycols. It will be apparent that polyester glycols derived from lactones or hydroxy acids may also be used.

Although polymeric glycols are preferred for use in the present invention, the difunctional polymer (instead of having terminal hydroxyl groups) may have $NH_2$ end groups, e.g. may be of the formula $NH_2$—G—$NH_2$, as in the amineterminated, low-melting copolyamides, copolyurethanes, and polyhydrocarbons, e.g. diaminopolyisoprene, as taught in U.S. 3,044,989. It will be understood that the low-melting hydroxyl-terminated or amine-terminated polymers may contain some carboxyl end groups, as is known in the art. However, the proportion of these should be small in order for the segmented polymer to consist essentially of recurring units as above defined.

Polymeric glycols or diamines having the desired combination of molecular weight and low melting point may be obtained by the use of copolymers or by interrupting the polymer chain with other linking groups. For example, a urethane-interrupted polymer may be conveniently made by reacting a polymeric glycol, such as a polyether glycol or a polyester glycol, with a molar deficiency of a diisocyanate. In such cases, a conventional, unsymmetrical diisocyanate OCN—R'—NCO of the prior art, such as tolylene diisocyanate, rather than the sterically hindered tertiary diisocyanates described herein may be used as a coupling agent. In the case where no coupling diisocyanate is used, $m$ in the formula will have a value of zero. In cases where such a diisocyanate is used, R' is derived from this diisocyanate and $m$ will have a value greater than zero. Other polyisocyanates which may furnish the R' radical include m-phenylene diisocyanate, 4,4'-biphenylene diisocyanate, p,p'-methylenediphenyl diisocyanate, 4-chloro-1,3-phenylene diisocyanate, 1,5-naphthylene diisocyanate, tetramethylene diisocyanate, hexamethylene diisocyanate, decamethylene diisocyanate, cyclohexylene diisocyanate, 4,4'-methylenedicyclohexyl diisocyanate, 1,5-tetrahydronaphthylene diisocyanate and benzene triisocyanate. For the highest degree of whiteness retention in the products of this invention, it is preferred that the coupling diisocyanate, if any, be free of NCO groups attached to an aromatic nucleus. The hindered tertiary diisocyanates described in greater detail hereinafter may also be used as coupling agents.

The polymeric glycol or diamine is provided with terminal isocyanate groups by a "capping" reaction with a stoichiometric excess of a polyisocyanate component $R(NCO)_y$, wherein $y$ is 2 to 4, which preferably includes at least in part one or more of certain hindered tertiary diisocyanates. Not all of the diisocyanate used for the "capping" reaction need be of the hindered tertiary class. Mixtures of hindered tertiary diisocyanates with up to 45 mol percent of polyisocyanates outside the hindered tertiary class may be used and are intended to be within the scope of the present invention. Other polyisocyanates which can be used in such a mixture are illustrated above in connection with the definition of the radical R'. Of course, as greater proportions of the extraneous polyisocyanates are used, the improvement in whiteness retention or elastic power of fibers or other shaped articles is lessened.

In the segmented polymers described above, the hindered tertiary diisocyanate component is largely responsible for improved whiteness retention and elastic power. By utilizing a 1,3-diaminocyclohexane chain-extender in conjunction with such a diisocyanate, the resulting segmented polymer in addition possesses a high degree of solubility in commercial organic solvents. The improved solubility properties are of particular benefit in the spinning of fibers or in the casting of films.

The hindered tertiary diisocyanates have the following structural formula:

$$OCN-\underset{R''}{\overset{R''}{C}}-X-\underset{R''}{\overset{R''}{C}}-NCO$$

wherein R″ is methyl, ethyl, or n-propyl and X has the significance recited hereinabove. Diisocyanates of this type are disclosed in U.S. Pat. 2,723,265 and in French Pat. 1,299,557. It will be understood that in the above formulas the R″ groups may be the same or different; however, for the test fiber properties it is preferred that they be alike. Examples of suitable hindered tertiary diisocyanates are α,α,α′,α′-tetramethyl-p-xylylene diisocyanate, α,α-dimethyl, α′,α′-diethyl-p-xylylene diisocyanate α,α,α′,α′ - tetrapropyl - p - xylylene diisocyanate. Specific examples of still other hindered tertiary diisocyanates within the above formula that may be employed are summarized in the following table:

| R″ groups | X radical | Y radical |
|---|---|---|
| Each methyl | p-phenylene | |
| Do | 1,4-cyclohexylene | |
| Do | 4,4′-biphenylene | |
| Do | 1,4-naphthylene | |
| Do | 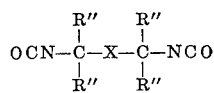 | |
| Do | 1,5-naphthylene | |
| Do | 2,6-naphthylene | |
| Do | ⌬⌬ (fused bicyclic) | |
| Do | —⌬—Y—⌬— | —CH₂— |
| Do | Same as above | —CH₂—CH₂— |
| Do | do | —O— |
| Do | do | —C(CH₃)₂— |
| Do | do | —S— |
| Do | do | —SO— |
| Do | do | —SO₂— |
| Do | —⌬—CH₃ | |
| Do | —⌬—CH₂CH₃ | |
| Do | —⌬—OCH₃ | |

As indicated by the above formula of the diisocyanates, the relative position of the hindered isocyanate groups is essential for improved fiber properties. For example, the tetramethyl-m-xylylene diisocyanate gives a fiber of markedly inferior properties as compared to a fiber produced from the corresponding para isomer.

Specific examples of diisocyanates other than the hindered tertiary diisocyanates suitable for constituting the total "capping" polyisocyanate component are p,p′-phenylenediethyl diisocyanate (p-bis-isocyanatoethylbenzene), m-xylylene diisocyanate, hexahydro-m-xylylene diisocyanate, hexahydro-p-xylylene diisocyanate, 1,3-cyclohexylene diisocyanate, 1,2 - cyclobutylenedimethyl diisocyanate, 1,4-cyclohexylene diisocyanate, 3,3′- and 4,4′-dicyclohexylene diisocyanates, 4,4′ - methylene-dicyclohexyl diisocyanate, 4,4′ - bis(isocyanatomethyl)bicyclohexyl, 4,4′ - bis(isocyanatomethylcyclohexyl)methane, tetramethylene diisocyanate, pentamethylene diisocyanate, and hexamethylene diisocyanate.

Mixtures of diisocyanates within the formula for hindered diisocyanates given above may be used. This will give rise to products wherein the X groups and/or R″ groups in the formula of the polymer molecule may differ. It is preferred that the X groups be all alike and that the R″ groups be all alike.

Where the capping reaction involves the reaction of the polyisocyanates with a polymeric glycol, a catalyst is useful to shorten the reaction time but is not essential in carrying out this reaction. Conventional catalysts which accelerate the reaction of isocyanate and hydroxyl groups include tertiary amines, such as triethylene diamine, and various organometallic compounds, such as dibutyltin dilaurate. Mixtures of polymeric glycols may be used, thereby giving rise to a product in which the G groups in the formula will be different.

The isocyanate-terminated polymer is reacted with a chain-extender for preparation of the segmented polymer. The advantages of the invention are realized by the use of a hindered tertiary diisocyanate, as described above, in conjunction with 1,3-diaminocyclohexane as the chain-extender. At least 90 mol percent, although preferably all, of the radicals Q in the foregoing formulas are derived from this diamine. Lesser amounts of the 1,3-diaminocyclohexane do not give the full advantage of improved power. Where small amounts of other chain-extenders are used, the Q radicals in the formula will differ. The principal classes of other such chain-extenders that may be used in small amounts are (a) the non-aryl organic diamines, such as ethylene diamine, bis - (4 - aminocyclohexyl)methane, m-xylylenediamine; (b) hydrazine; (c) dihydrazides, such as carbohydrazide and the dihydrazides of oxalic and adipic acids; (d) organic glycols, such as ethylene glycol, tetramethylene glycol, and 1,4-bis(hydroxymethyl)cyclohexane; (e) water; and (f) piperazines, such as piperazine, 2,5 - dimethylpiperazine and 1,4-diaminopiperazine. The organic diamines, dihydrazides, and glycols may contain heteroatoms and other functional groups which are less reactive with NCO than hydroxyl. When water is used as chain-extender, $p$ in the formula is zero for a minor portion of its occurrences; otherwise, $p$ has a value of 1. In any case the chain-extender is preferably chosen such that in a separate reaction with the polyisocyanate used in the capping reaction it will produce a nitrogen-containing polymer having a melting point above about 200° C. in its fiber-forming molecular-weight range. The preferred segmented polymers will have recurring units which contain from about 50% to about 95% by weight of soft segments and 5 to 50% by weight of hard segments as above defined.

As indicated above, the utilization of 1,3-diaminocyclohexane in conjunction with the hindered tertiary diisocyanates gives polymers which have markedly improved solubility properties. As a result, these polymers are particularly well-suited to the wet-spinning and dry-spinning of filaments. As a further advantage, it has been found that fibers of improved heat-setability and power properties can also be realized provided that the 1,3-diaminocyclohexane chain-extender contains 25 to 50% of the trans isomer. The utilization as a chain-extender of an isomeric mixture containing 30 to 45% of the trans isomer is especially preferred for this purpose.

It should be apparent that the length of the segment containing the chain-extender may be regulated by adding additional amounts of monomeric diisocyanate together with the chain-extender during the chain-extension reaction. When no unreacted monomeric diisocyanate is present during the chain-extension, the length of this segment will be at a minimum, and $q$ in the formula will be 1. Catalysts are generally unnecessary with the diamine chain-extenders. In order to obtain the desired molecular weight of the segmented polymer, a small amount of a chain-terminator, e.g. diethylamine, may be included in the chain-extension reaction, as is well known to those skilled in the art.

The segmented polymers of this invention may be prepared by known polymerization techniques. They are preferably made by solution polymerization, which involves dissolving the reactants, i.e. the isocyanate-terminated polymer and chain-extender, in separate portions of a suitable solvent which also serves as a solvent for the resulting segmented polymer. The two solutions are then mixed and stirred for a period of time ranging from a few minutes up to several hours at a temperature between about 0° and about 100° C. During this time the viscosity increases and the polymer may be separated and purified according to known methods. Suitable solvents for the polymerization reaction include N,N-dimethylformamide, N,N-dimethylacetamide, N-methylpyrrolidone, hexamethylphosphoramide, dimethyl sulfoxide, and tetramethylene sulfone. Alternatively, the polymers of this invention may be prepared by other polymerization techniques, as described in Frankenburg et al. U.S. 2,957,852.

One advantage of preparing the polymers in a solvent is that the solution may be used directly for the spinning of elastic fialements. The filaments may be obtained by conventional procedures, including dry-spinning and wet-spinning. Shaping and polymerization may also be combined into a single step by the process described in Koller U.S. Re. 24,689 and generally known as chemical-spinning. The properties of the filaments may be improved by a cold-drawing operation, for example, at draw ratios from about 2× to about 10×.

The segmented polymers most useful for elastic filament applications are those having an inherent viscosity above 0.5. Inherent viscosity refers to the value of the expression $$\frac{\ln\left(\frac{\eta}{\eta_0}\right)}{c}$$

in which $\eta$ is the viscosity of a dilute solution of the polymer at 25° C., $\eta_0$ is the viscosity of the solvent (hexamethylphosphoramide) in the same units and at the same temperature, and $c$ is 0.5, the concentration in grams of the polymer per 100 ml. of solution.

It is to be understood that the segmented polymers of this invention may have a substantially linear polymeric structure, or they may be cross-linked to some extent. The term "substantially linear" is not intended to exclude polymers which have branches extending out from the main polymer chain. Cross-linked products may be obtained by using reactants with a functionality of more than two, but this is generally less satisfactory since an excessive degree of coss-linking interferes with the shaping of the filaments. Cross-linked filaments may be prepared directly by the process of chemical spinning using reactants having a functionality of more than two, e.g. by the process disclosed in the aforementioned Koller reissue patent. Alternatively, the substantially linear filaments may be cross-linked by conventional methods after shaping, such as by heating with an excess of organic diisocyanate. Typical reactants that may, for example, be used as a part of the chain-extender to provide some degree of cross-linking, include diethylene triamine, trimethylol propane and glycerine. The preferred products of the invention will have no more than one cross-link for each 2,000 molecular weight portion of the polymer chain in order to achieve the benefits of this invention.

Among the numerous modifications which are possible, it will be apparent that novel polymers of the invention can be combined with common additives such as dyes, pigments, antioxidants, delusterants, antistatic agents, U.V. stabilizers and the like. In the production of fibers, these may be included with the polymer prior to fiber formation or be incorporated by other suitable treatments. It will be further understood that although the filament-forming component of elastic fibers or other products should preferably consist essentially of polymers having recurring units as defined by the formulas above, nevertheless the invention contemplates the use of polymer mixtures which includes, in part, other conventional polymers.

This invention will be further illustrated, but is not intended to be limited, by the following examples in which parts and percentages are by weight unless otherwise specified. The terms $P_{100}$ and $_{200}$ refer to the fifth-cycle, unload values of stress ("power") at the elongations indicated by the respective subscripts, after cycling as follows: yarn is cycled five times between zero and 300% extension at a constant rate of elongation, i.e., 800% per minute. The sample is held at the maximum extension for one half-minute after the fifth extension to permit stress decay. Stress, on unloading from this last extension, is measured and is expressed in terms of grams per denier at the elongation indicated by the respective subscript. At the end of the fifth cycle, the length of the yarn is measured afer being allowed to recover for one half-minute, and is used in the determination of "set" described hereinafter. The length of yarn is measured between two marks placed on the yarn before testing. This technique is used to avoid error caused by slippage of the yarn sample in the clamps of the testing instrument.

The term "set" refers to the increase in length of the sample as a result of the 5-cycle test described above and is expressed as percent of original length. The terms "elongation" and "tenacity" refer, respectively, to the percent elongation at break and the stress measured in grams at the break, this stress being divided by the initial fiber denier before cycling.

The degree of yellowness, referred to in the examples as "$b$" value, is determined from colorimetric data obtained by analyzing continuous filament samples in aggregates which are about three inches square. The reflectance ratios of the samples in the green and blue filter settings of a colorimeter are measured, using a Model IV Color Master Differential Colorimeter, manufactured by Manufacturers Engineering and Equipment Corporation, Hatboro, Pa., and calibrated against the manufacturer's standard reference plates and the National Bureau of Standards' certified reflectance plates. Three readings are taken on each of the samples, one of the measurements for the filament samples being made with the sample rotated 90° from the position of the first reading. The "b" values are then calculated from the average of three readings, using the following formula $$b = 42.34(G^{1/3} - B^{1/3})$$

where G represents the reflectance ratio with the green filter and B represents the reflectance ratio with the blue filter.

The test for smog discoloration is performed by wrapping samples of continuous filaments on a metal frame and exposing them to a synthetic atmosphere containing air, nitrogen dioxide, sulfur dioxide, and 2-pentene for four hours, during which exposure the samples are irradiated by a combination of ultraviolet and visible light. The samples are measured for color, both before and after exposure.

The test for chlorine discoloration is performed by wrapping the filaments on a block of polytetrafluoroethylene, measuring the samples for color, and then immersing them for five 45-minute periods in an aqueous solution containing 150 parts per million of active chlorine at 70° C. The samples are rinsed with cold water, dried thoroughly, and again measured for color.

Example 1

A mixture of 215.7 parts of polytetramethyleneether glycol having a molecular weight of about 2,000 and 51.30 parts of α,α,α',α'-tetramethyl-p-xylene diisocyanate is heated with stirring at about 80° C. until it becomes homogeneous. The mixture is cooled to 55° C., and 0.06 part of dibutyltin dilaurate is added. The mixture is then heated for 40 minutes at 90° C. to yield an isocyanate-terminated polyether which contains 3.49% NCO. A solution is formed by dissolving 112.8 parts of the isocayanate-terminated polyether in 418 parts of dry N,N-dimethylacetamide. To this solution is added with stirring at ambient temperature 57 parts of a solution obtained by dissolving 8.17 parts of 1,3-diaminocyclohexane (70/30 ratio of cis/trans isomers) in 85.75 parts of dimethylacetamide. The viscous solution of segmented polymer obtained contains 20% solids. The segmented polymer has an inherent viscosity of 1.51.

To the viscous solution of segmented polymer is added 1.2 parts of 2,4,6-tris(3,5-di-t-butyl-4-hydroxybenzyl)-mesitylene ("Ionox" 330). This solution is dry-spun in the usual way to produce elastic filaments. The filaments are boiled off in a relaxed condition for one hour and are allowed to dry at room temperature. The filaments possess the following physical properties: denier, 72; tenacity, .93 g.p.d.; elongation, 650%; set, 12%; $P_{100}$, .042 g.p.d.; $P_{200}$, .085 g.p.d.; stress decay, 18%.

The filaments are nearly colorless and show unusually good whiteness retention on exposure to smog and chlorine, as indicated by the following data:

|  | "b" Values | | |
| --- | --- | --- | --- |
|  | As prepared | After exposure | Δb |
| Smog discoloration | 1.7 | 4.9 | 3.2 |
| Chlorine discoloration | 1.8 | 2.6 | 0.8 |

For comparison, a similar segmented polymer is prepared in which equivalent amounts of a conventional diisocyanate, p,p'-methylenediphenyl diisocyanate, and a conventional diamine, m-xylylene diamine, are used in the polymer preparation in place of α,α,α',α'-tetramethyl-p-xylene diisocyanate and 1,3-diaminocyclohexane. All other ingredients and conditions are kept unchanged in the preparation. With the conventional polymer the discoloration data are as follows:

|  | "b" Values | | |
| --- | --- | --- | --- |
|  | As prepared | After exposure | Δb |
| Smog discoloration | 0.7 | 10.2 | 9.5 |
| Chlorine discoloration | 2.0 | 13.1 | 11.1 |

Example 2

A mixture of 1020 parts of ethylene glycol, 1270 parts of trimethylene glycol and 2,000 parts of adipic acid is heated under nitrogen for 4 hours at 180–185° C., at atmospheric pressure and then for 4 hours at 210–220° C. under vacuum. There is obtaind a copolyester melting below room temperature and having a molecular weight of approximately 2400.

A mixture of 125.0 parts of the above-described copolyester and 25.50 parts of α,α,α',α'-tetramethyl-p-xylylene diisocyanate is stirred and heated at 80° C. Until homogeneous. The mixture is cooled to 65° C. and 0.02 part dibutyltin dilaurate is added. The mixture is then heated for 40 minutes at 90° C. to produce an isocyanate-terminated copolyester which contains 2.58% NCO. A solution is prepared by dissolving 145.7 parts in 400 parts of dimethylacetamide. To this solution is then added with stirring at ambient temperature 57.5 parts of a solution prepared by dissolving 21.40 parts of 1,3-diaminocyclohexane (70/30 ratio of cis/trans isomers) in 213.6 parts of dimethylacetamide. The viscous solution of segmented polymer obtained contains 25% solids and has a viscosity of 70 poises. To this solution is added 2.0 parts of isocyanate-terminated copolyester prepared by reacting 2 mols of 4,4'-methylenedicyclohexyl diisocyanate (containing 26% of trans/trans isomer) with one mol of the copolyester described in the first paragraph of this example. At this point the solution contains a small amount of unreacted NCO groups. A solution of 1,3-diaminocyclohexane is slowly added until the solution of segmented polymer remains permanently basic to bromphenol blue indicator. At this point the solution of segmented polymer has a viscosity of 230 poises.

To this solution is then added a slurry of titanium dioxide in a solution of the segmented elastomer of Example 1 in dimethylacetamide, and a solution of 2-(2'-hydroxy-3'-t-butyl-5'-methylphenyl) - 5 - chloro-benzotriazole and "Ionox" 330 in dimethylacetamide such that the final mixture contains 5.3%, 0.5%, and 1.1% respectively of each additive, based on the solids of segmented polymer of the preceding paragraph. The viscous solution of segmented polymer containing these additives is dry-spun in the usual way to produce filaments of good elasticity.

Example 3

A solution of segmented elastomer is prepared as described in Example 1 except that no "Ionox" 330 is added. In this preparation the segmented polymer has an inherent viscosity of 1.22. It is dry-spun in the usual way to produce elastic filaments having the following physical properties after boil-off: denier, 78; tenacity, .70 g.p.d.; elongation, 577%; set, 10%; $P_{100}$, .036 g.p.d.; $P_{200}$, .072 g.p.d.; stress decay, 21%.

On exposure to smog and chlorine the following results are obtained:

|  | "b" Values | | |
| --- | --- | --- | --- |
|  | As prepared | After exposure | Δb |
| Smog discoloration | 2.0 | 3.7 | 1.7 |
| Chlorine discoloration | 3.2 | 0.3 | −2.9 |

Example 4

A mixture of 148 parts of polytetramethylene-ether glycol having a molecular weight of 964, 850 parts of polytetramethylene-ether glycol having a molecular weight of 1556, and 256 parts of $\alpha,\alpha,\alpha',\alpha'$-tetramethyl-p-xylylene diisocyanate is heated with stirring at about 80° C. until the mixture becomes homogeneous. The mixture is cooled to 55° C. and about 0.02 part of dibutyltin dilaurate is added. The mixture is heated for 60 minutes at 70–80° C. and yields an isocyanate-terminated polyether containing 2.07% NCO. To a solution of 600 parts of the isocyanate-terminated polyether dissolved in 1900 parts of dimethylacetamide is added with stirring at ambient temperature 110 parts of a solution obtained by dissolving 40.0 parts of 1,3-diaminocyclohexane (70/30 ratio of cis-trans isomers) in 250 parts of dimethylacetamide. The inherent viscosity of the polymer is 1.60.

To the viscous polymer solution is added 90.0 parts of the slurry prepared from 29.2 parts dimethylacetamide, 30.5 parts titanium dioxide, 6.5 parts "Ionox" 330, 0.08 parts ultramarine blue pigment, 18.3 parts poly(N,N-diethylaminoethyl methacrylate), and 3.22 parts 2-(2'-hydroxy-3'-t-butyl-5'-methylphenyl)-5 - chlorobenzotriazole. The mixture is heated to 82° C. and then dry-spun, yielding elastic filaments which, after boil-off for one hour in a relaxed condition and drying at room temperature, possess the following properties: denier, 70; tenacity, .45 g.p.d.; elongation, 549%; set, 12%; $P_{100}$, .039 g.p.d.; $P_{200}$, .087 g.p.d.; stress decay, 17%.

Examples 5–12

In the following examples, segmented polymers are prepared by carrying out the polymerization reactions in hexamethylphosphoramide or in dimethylacetamide under conditions similar to those used in the preceding examples. The respective polymeric glycols, diisocyanates, and chain-extenders used are indicated in the following table.

| Example No. | Polymeric glycol | Diisocyanate | Chain extenders[1] |
|---|---|---|---|
| 5 | Polytetramethylene ether glycol (2,000 M.W.) | $\alpha,\alpha,\alpha',\alpha'$-tetraethyl-p-xylylene | 1,3-diaminocyclohexane. |
| 6 | do | $\alpha,\alpha_1$-dimethyl-$\alpha,\alpha'$-diethyl-p-xylylene | Do. |
| 7 | do | $-\underset{\underset{CH_3}{\mid}}{\overset{\overset{CH_3}{\mid}}{C}}-CH_2-\langle\hspace{-2pt}\bigcirc\hspace{-2pt}\rangle-CH_2-\underset{\underset{CH_3}{\mid}}{\overset{\overset{CH_3}{\mid}}{C}}-$ | Do. |
| 8 | do | $-\underset{\underset{CH_3}{\mid}}{\overset{\overset{CH_3}{\mid}}{C}}-\langle\hspace{-2pt}\bigcirc\hspace{-2pt}\rangle-\langle\hspace{-2pt}\bigcirc\hspace{-2pt}\rangle-\underset{\underset{CH_3}{\mid}}{\overset{\overset{CH_3}{\mid}}{C}}-$ | Do. |
| 9 | do | $-\underset{\underset{CH_3}{\mid}}{\overset{\overset{CH_3}{\mid}}{C}}-\langle\hspace{-2pt}\bigcirc\hspace{-2pt}\rangle-CH_2-CH_2-\langle\hspace{-2pt}\bigcirc\hspace{-2pt}\rangle-\underset{\underset{CH_3}{\mid}}{\overset{\overset{CH_3}{\mid}}{C}}-$ | Do. |
| 10 | do | $\alpha,\alpha,\alpha',\alpha'$, tetramethyl-p-xylylene/p-xylylene (75/25) | Do. |
| 11 | do | $\alpha,\alpha,\alpha',\alpha'$,-tetramethyl-p-xylylene/p,p'-methylenediphenyl (90/10). | Do. |
| 12 | Polyesterurethane glycol [2] | $\alpha,\alpha,\alpha',\alpha'$-tetramethyl-p-xylylene | Do. |

[1] 67/33 cis/trans isomer ratio.
[2] From 3 mols of polycaprolactone (740 M.W.) and 2 mols of tolylene diisocyanate.

The polymer solutions from Examples 5 through 12 can be spun to yield strong, nondiscloring, elastic filaments. Filament properties are easily approximated by casting films from the polymer solutions, which are then thoroughly dried and cut into thin strips. The respective samples have the following physical properties:

| | Stress decay (percent) | Set (percent) | $P_{100}$ (g.p.d.) | $P_{200}$ (g.p.d.) | Tenacity (g.p.d.) | Elongation (percent) |
|---|---|---|---|---|---|---|
| Example No.: | | | | | | |
| 5 | 18 | 11 | 0.035 | 0.065 | 0.59 | 616 |
| 6 | 18 | 12 | 0.029 | 0.060 | 0.50 | 600 |
| 7 | 13 | 8 | 0.032 | 0.053 | 0.44 | 652 |
| 8 | 18 | 19 | 0.022 | 0.048 | 0.46 | 729 |
| 9 | 18 | 31 | 0.020 | 0.054 | 0.25 | 586 |
| 10 | 15 | 13 | 0.036 | 0.065 | 0.43 | 569 |
| 11 | 19 | 13 | 0.030 | 0.056 | 0.44 | 592 |
| 12 | 16 | 15 | 0.024 | 0.058 | 0.54 | 647 |

MONOMER PREPARATION (A) The diisocyanate of Example 6 is prepared as follows: One mole of p-diacetylbenzene is reacted with two moles of ethylmagnesium bromide by a standard Grignard reaction to yield the ditertiary alcohol which corresponds to the desired diisocyanate. The latter alcohol is then converted to the corresponding dibromide with HBr. The dibromide is finally reacted with silver cyanate to give the indicated diisocyanate.

(B) The diisocyanate of Example 5 is prepared as follows: one mole of dimethyl terephthalate is reacted with four moles of ethylmagnesium bromide by a standard Grignard reaction to yield the ditertiary alcohol which corresponds to the desired diisocyanate. Conversion of the alcohol to the dibromide and then to the final diisocyanate is effected as in (A), above.

(C) The diisocyanate of Example 8 is prepared as follows: The diolefin compound p,p'-diisopropenylbiphenyl is reacted with HCl in diethyl medium to give the dichloride which corresponds to the desired diisocyanate. The dichloride derivative is reacted with silver cyanate to give the indicated diisocyanate.

(D) The diisocyanate of Example 9 is prepared as follows: The dichloride compound corresponding to the desired diisocyanate is reacted with silver cyanate as in (A), above.

(E) The diisocyanate of Example 14 is prepared as follows: one mole of dimethyl 2,6-naphthalenedicarboxylate is reacted with four moles of methylmagnesium bromide by a standard Grignard reaction to yield the ditertiary alcohol which corresponds to the desired diisocyanate. Conversion of the alcohol to the dibromide and then to the final diisocyanate is effected as in (A), above.

Example 13

A mixture of 1785 parts of polytetramethylene-ether glycol having a molecular weight of about 2,000 and 425 parts of α,α,α',α'-tetramethyl-p-xylene diisoyanate is heated with stirring at about 80° C. until it becomes homogeneous. The mixture is cooled to 55° C., and 0.02 part of dibutyltin dilaurate is added. The mixture is then heated for 60 minutes at about 73° C. to yield an isocyanate-terminated polyether which contains 3.2% NCO. A solution is formed by dissolving 421 parts of the isocyanate-terminated polyether in 1370 parts of dry N,N-dimethylacetamide. To this solution is added with stirring at ambient temperature 206 parts of a solution obtained by dissolving 19.61 parts of 1,3-diaminocyclohexane (having cis-trans isomer ratios as indicated below) in 197 parts of dimethylacetamide. The viscous solution of segmented polymer obtained contains 22% solids. The segmented polymer has an inherent viscosity of 1.37.

To the viscous solution thus prepared is added 71 parts of a slurry prepared from 87.6 parts dimethylacetamide, 91.5 parts titanium dioxide, 19.5 parts "Ionox" 330, 0.24 part ultramarine blue pigment, 54.9 parts poly (N,N-diethylaminoethyl methacrylate), and 9.66 parts 2-(2'-hydroxy-3'-t-butyl-5' - methylphenyl)-5-chlorobenzotriazole. The solution is dry-spun in the usual way to produce elastic filaments which posses the following as-spun physical properties:

| Cis-trans ratio of diamine | Set (percent) | $P_{100}$ (g.p.d.) | $P_{200}$ (g.p.d.) | Tenacity (g.p.d.) | Elongation (percent) |
|---|---|---|---|---|---|
| 97:3 | 20 | .034 | .085 | 0.68 | 438 |
| 82:18 | 18 | .037 | .088 | 0.69 | 479 |
| 67:33 | 10 | .043 | .105 | 0.77 | 405 |
| 55:45 | 14 | .040 | .095 | 0.60 | 414 |
| 42:58 | 23 | .033 | .079 | 0.53 | 511 |

While the reported values of power, tenacity, set, and elongation for each of these samples are quite good, the two utilizing a trans 1,3-diaminocyclohexane content in the range of 25 to 50% are exceptional.

Example 14

A mixture of 103.7 parts of polytetramethylene ether glycol having a molecular weight of about 2073 and 29.4 parts of 2,6-bis-(1-isocyanato-1-methylethyl)naphthalene is heated with stirring under dry nitrogen to 70° C. until it becomes homogeneous and 0.06 part of dibutyl tin dilaurate is added. The temperature of the stirred solution is maintained at 75° C. for 45 minutes to yield an isocyanate-terminated polyether which contains 2.98% NCO. A solution is formed by dissolving 15.7 parts of the isocyanate-terminated polyether in 60.4 parts of hexamethylphosphoramide. To this solution is added slowly with stirring at ambient temperature 5.6 parts of a solution prepared by dissolving 11.4 parts of 1,3-diaminocyclohexane (70/30 ratio of cis/trans isomers) in 100 parts of hexamethylphosphoramide. The addition of small amounts of diethylamine is used to regulate the viscosity of the polymer. The polymer solution obtained contains 20% solids. The segmented polymer has an inherent viscosity of 2.34. The polymer solution can be spun to yield strong non-discoloring elastic filaments. The filament properties are approximated by casting a film from the polymer solution, which is then thoroughly dried and cut into thin strips, which have the following properties: tenacity, 0.49 g.p.d.; elongation, 584%; $P_{100}$, 0.035 g.p.d.; $P_{200}$, 0.064 g.p.d.; stress decay, 17%; set, 10%.

As may be seen from the examples, filaments formed of the segmented polymers of this invention have a combination of excellent whiteness retention and good physical properties. The presence of the four R'' groups in the structure of the segmented polymers is a critical factor in achieving the high power for the elastic filaments. The four R'' groups in conjunction with the 1,3-diaminocyclohexane contribute to good solubility, thereby facilitating solution spinning of filaments. Elastic filaments of the segmented polymers, particularly in the bare or uncovered state, are useful in the manufacture of elastic fabrics of all types.

Since many different embodiments of the invention may be made without departing from the spirit and scope thereof, it is to be understood that the invention is not to be limited except to the extent defined in the following claims.

What is claimed is:

1. A segmented polymer consisting essentially of recurring units of the formula:

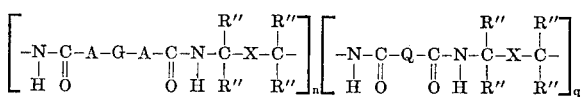

wherein

—A— is selected from the class consisting of —O— and

—G— is the residue remaining after removal of the terminal functional groups from an amorphous polymer having a melting point below 60° C. and a molecular weight above 600, said amorphous polymer being selected from the group consisting of hydroxyl-terminated polyethers, polyesters, copolyetheresters, polyacetals, polysiloxanes, and N-alkylated polyurethanes, and amine-terminated copolyamides, copolyurethanes, and polyhydrocarbons;

—Q— is the radical remaining after removal of one hydrogen atom from each amine group in 1,3-diaminocyclohexane, with the further proviso that 25 to 50% of said radicals are of the trans isomeric form and the remaining 50 to 75% are of the cis isomeric form;

R'' is a lower alkyl radical selected from the class consisting of methyl, ethyl and n-propyl;

—X— is a radical selected from the class consisting of
  (a) p-phenylene,
  (b) p-xylylene,
  (c) 1,4-cyclohexylene,
  (d) 4,4'-biphenylene,
  (e) 1,4-naphthylene,
  (f) 1,5-naphthylene,
  (g) 2,6-naphthylene,
  (h)

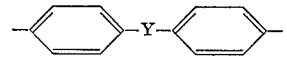

wherein —Y— is selected from the class consisting of —CH$_2$—, —CH$_2$CH$_2$—, —O—,

—S—, —CO—, and —SO$_2$—

(i) radicals as defined in (b), (d), (e), (f), (g), and (h) hydrogenated in the ring, and
  (j) radicals as defined in (a), (b), (c), (d), (e), (f), (g), (h), and (i) having substituted on the ring at least one substituent of the class consisting of methyl, methoxy, and ethyl;

n and q are small positive integers from 1 through about 8.

2. A segmented polymer of claim 1 wherein —A— is —O—.

3. A segmented polymer of claim 2 wherein the amorphous polymer is a polyalkyleneether glycol.

4. A segmented polymer of claim 3 wherein the polyalkyleneether glycol is a urethane-interrupted polyalkyleneether glycol.

5. A segmented polymer of claim 3 wherein the polyalkyleneether glycol is polytetramethyleneether glycol.

6. A segmented polymer of claim 2 wherein the amorphous polymer is a polyester glycol.

7. A segmented polymer of claim 6 wherein the polyester glycol is a urethane-interrupted polyester glycol.

8. An elastic fiber in which at least 85% by weight of the fiber-forming polymeric material thereof is the segmented polymer of claim 2.

9. A segmented polymer of claim 1 wherein —X— is p-phenylene and each R″ is methyl.

10. An elastic fiber of a segmented polymer according to claim 1 wherein said polymer contains on an average less than about one cross-link for each 2000 molecular weight portion of the polymer chain.

11. A segmented polymer according to claim 1 wherein said recurring units are substantially linear.

12. An elastic fiber of the segmented polymer of claim 1.

13. An elastic film of the segmented polymer of claim 1.

14. A segmented polymer of claim 1 wherein 30 to 45% of the radicals Q are of the trans isomeric form and the remaining 55 to 70% are of the cis isomeric form.

References Cited

UNITED STATES PATENTS

| | | | |
|---|---|---|---|
| 3,097,192 | 7/1963 | Schilit | 260—75 |
| 2,929,804 | 3/1960 | Steuber | 260—77.5 |
| 2,723,265 | 11/1955 | Stallmann | 260—77.5X |
| 3,115,479 | 12/1963 | Windemuth et al. | 260—47 |
| 3,290,350 | 12/1966 | Hoover | 260—453 |
| 3,359,243 | 12/1967 | Criner | 260—77.5 |
| 3,386,942 | 6/1968 | Bell et al. | 260—37 |
| 3,422,143 | 1/1969 | Bottomley et al. | 260—570.8 |

FOREIGN PATENTS

| | | |
|---|---|---|
| 846,176 | 8/1960 | Great Britain. |
| 1,299,557 | 6/1962 | France. |

OTHER REFERENCES

Hoover et al., "Journal of Organic Chemistry," vol. 29 (1964), pp. 143–145.

DONALD E. CZAJA, Primary Examiner

H. S. COCKERAM, Assistant Examiner

U.S. Cl. X.R.

260—77.5